United States Patent [19]

Eckel et al.

[11] Patent Number: 5,145,911

[45] Date of Patent: * Sep. 8, 1992

[54] POLYCARBONATE MOLDING COMPOSITION

[75] Inventors: Thomas Eckel, Dormagen; Dieter Freitag, Krefeld; Uwe Westeppe, Mettmann; Dieter Wittmann, Cologne, all of Fed. Rep. of Germany

[73] Assignee: Bayer Aktiengesellschaft, Leverkusen, Japan

[ * ] Notice: The portion of the term of this patent subsequent to Apr. 14, 2009 has been disclaimed.

[21] Appl. No.: 534,094

[22] Filed: Jun. 6, 1990

[30] Foreign Application Priority Data

Jun. 10, 1989 [DE] Fed. Rep. of Germany ....... 3919043

[51] Int. Cl.$^5$ .............................................. C08L 69/00
[52] U.S. Cl. ........................................ 525/67; 525/464
[58] Field of Search ................... 525/67; 528/196, 204

[56] References Cited

U.S. PATENT DOCUMENTS

| | | | |
|---|---|---|---|
| 3,398,212 | 8/1968 | Jackson, Jr. | 260/860 |
| 3,644,574 | 2/1972 | Jackson et al. | 260/373 |
| 3,988,389 | 10/1976 | Margotte | 525/67 |
| 4,013,613 | 3/1977 | Abolins et al. | 260/40 |
| 4,469,833 | 9/1984 | Mark | 524/161 |
| 4,554,309 | 11/1985 | Mark et al. | 524/611 |
| 4,839,421 | 6/1989 | Buysch et al. | 525/67 |
| 4,839,426 | 6/1989 | Gallucci | 525/146 |
| 4,982,014 | 1/1991 | Freitag | 528/196 |

FOREIGN PATENT DOCUMENTS 362646  4/1991  European Pat. Off. .

*Primary Examiner*—James J. Seidleck
*Assistant Examiner*—David Buttner
*Attorney, Agent, or Firm*—Joseph C. Gil; Aron Preis

[57] ABSTRACT

A thermoplastic molding composition comprising (i) an aromatic polycarbonate having high thermal dimensional stability and based on a substituted dihydroxydiphenylcycloalkane, (ii) other aromatic polycarbonate resin and (iii) graft, particle-type diene rubbers is disclosed. The composition is characterized by its good Izod impact strength. A process for preparing the molding composition and their use for manufacturing molded bodies are also disclosed.

3 Claims, No Drawings

POLYCARBONATE MOLDING COMPOSITION

FIELD OF THE INVENTION

The invention relates to a thermoplastic molding composition comprising an aromatic polycarbonate based on substituted dihydroxydiphenylcycloalkanes, other polycarbonate reisn and graft, particle-type diene rubbers, a process for preparing the molding composition and their use for manufacturing molded articles, especially by injection molding.

SUMMARY OF THE INVENTION

The invention relates to (i) a thermoplastic molding composition comprising an aromatic polycarbonate having a high thermal dimensional stability and based on substituted dihydroxydiphenylcycloalkanes, other aromatic polycarbonates which contain, for example bisphenol-A units and graft, particle-type diene rubbers, (ii) a process for preparing the molding compounds by mixing the components at elevated temperature and (iii) their use for manufacturing molded bodies, especially by injection molding.

BACKGROUND OF THE INVENTION

Molding compositions from aromatic polycarbonates based on bisphenol-A units and ABS plastics (diene rubbers grafted with styrene and acrylonitrile) are known. In general they have very high Izod impact strength, especially at lower temperatures. In practice, the relatively low thermal dimensional stability of these molding compositions has proved to be disadvantageous, for example in the manufacture of vehicle parts which have to be exposed to coating conditions, that is temperatures of 140° to 160° C.

It has now been found that the thermal dimensional stability of molding compositions of this type is considerably improved if specific polycarbonates based on substituted dihydroxydiphenylcycloalkanes are added. The good Izod impact strength is retained in these modified molding compositions. This is unexpected as the aromatic polycarbonates based on substituted dihydroxydiphenylcycloalkanes added, themselves have a considerably lower impact strength.

DETAILED DESCRIPTION OF THE INVENTION

The object of the invention is a thermoplastic molding composition comprising:
- A) 5 to 99, preferably 40 to 98, particularly 60 to 97 parts by weight, relative to the weight of the molding composition, of an aromatic polycarbonate based on substituted dihydroxydiphenylcycloalkanes,
- B) 5 to 99, preferably 40 to 98, particularly 60 to 97 parts by weight, relative to the weight of the molding composition, of a further aromatic polycarbonate (which contains, for example bisphenol-A units), and
- C) 1 to 95, preferably 2 to 60, particularly 3 to 40 parts by weight, relative to the weight of the molding composition, of a graft polymer of
- C.1 5 to 90, preferably 20 to 80 parts by weight of a mixture of
- C.1.1 50 to 95, preferably 60 to 95 wt.% of styrene, α-methylstyrene, styrene which is ring-substituted by halogen or $C_1$–$C_4$-alkyl, methacrylates, acrylates or mixtures thereof, and
- C.1.2 5 to 50, preferably 5 to 40 wt.%, of acrylonitrile, methacrylonitrile, methacrylates, acrylates, maleic imides, $C_1$–$C_4$-alkyl substituted maleic derivatives, phenyl-N-substituted maleic imides or mixtures thereof, on
- C.2 10 to 95, preferably 20 to 80 parts by weight, of diene rubber having an average particle diameter d50 of 0.09 to 1μm, preferably 0.09 to 0.6 μm and a gel content of more than 50 preferably more than 70, in particular 73 to 98 wt.%, relative to C.2.

Polycarbonates

Polycarbonates, corresponding to component A above, are high molecular, thermoplastic, aromatic polycarbonates having molecular weights Mw (weight average) of at least 10,000, preferably 20,000 to 300,000, which contain bifunctional structural units of the formula (I),

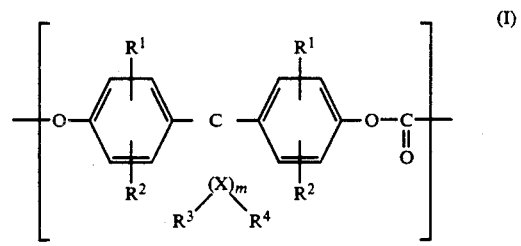

wherein
$R^1$ and $R^2$ independently of one another denote hydrogen, halogen, preferably chlorine or bromine, $C_1$–$C_8$-alkyl, $C_5$–$C_6$-cycloalkyl, $C_6$–$C_{10}$-aryl, preferably phenyl, and $C_7$–$C_{12}$-aralkyl, preferably phenyl-$C_1$–$C_4$, in particular benzyl,
m denotes a whole number from 4 to 7, preferably 4 or 5,
$R^1$ and $R^2$ which are selected individually for each X, independently of one another denote hydrogen or $C_1$–$C_6$-alkyl, and
X denotes carbon,
with the proviso that $R^3$ and $R^4$ simultaneously denote alkyl on at least one atom X.

Starting products for polycarbonates A are dihydroxydiphenylcycloalkanes of the formula (II),

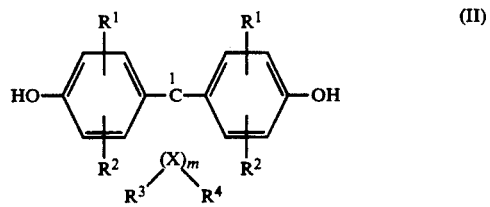

wherein
X, $R^1$, $R^2$, $R^3$, $R^4$ and m have the meaning mentioned for formula (I).
$R^3$ and $R^4$ are preferably simultaneously alkyl at 1 to 2 X atoms, in particular only at one X atom. Methyl is the preferred alkyl radical; the X atoms in α-position to the diphenyl-substituted C atom (C.1) are preferably not dialkyl-substituted, on the other hand alkyl disubstitution in the β-position to C.1 is preferred.

Dihydroxydiphenylcycloalkanes having 5 and 6 ring C atoms in the cycloaliphatic radical (m=4 or 5 in formula (II)), for example the diphenols of the formulae (IIa) to (IIc),

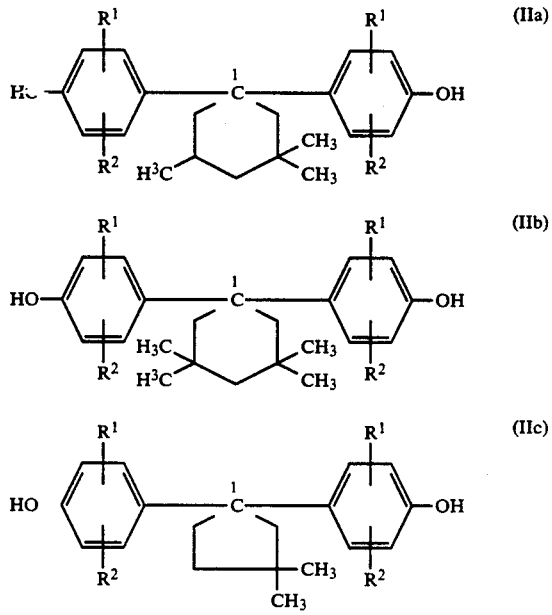

are preferred, wherein 1,1-bis-(4-hydroxyphenyl)-3,3,5-trimethylcyclohexane (formula (IIa) where $R^1$ and $R^2$ are H) is particularly preferred.

Polycarbonates A can be prepared in accordance with German patent application no. P 3 832 396.6 from diphenols of the formula (II).

Both a diphenol of the formula (II), with formation of homopolycarbonates, and several diphenols of the formula (II), with formation of copolycarbonates, can be used.

In addition, diphenols of the formula (II) can also be used as a mixture with other diphenols, for example with those of the formula (III)

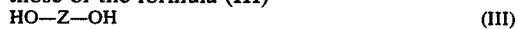

to prepare high molecular, thermoplastic, aromatic polycarbonates.

Suitable other diphenols of the formula (III) are those in which Z is an aromatic radical having 6 to 30 C atoms which can contain one or more aromatic rings, can be substituted and can contain aliphatic radicals or cycloaliphatic radicals other than those of the formula (11), or hetero atoms as bridge members.

Examples of diphenols of the formula (II) are hydroquinone, resorcinol, dihydroxydiphenyls, bis-(hydroxyphenyl)-alkanes, bis-(hydroxyphenyl)-cycloalkanes, bis-(hydroxyphenyl)sulphides, bis-(hydroxyphenyl)-ethers, bis-(hydroxyphenyl)-ketones, bis-(hydroxyphenyl)-sulphones, bis-(hydroxyphenyl)-sulphoxides, $\alpha,\alpha'$-bis-(hydroxyphenyl)diisopropylbenzenes and their ring-alkylated and ring-halogenated compounds.

These and further suitable other diphenols are described, for example in U.S. Pat. Nos. 3,028,365 2,999,835, 3,148,172, 3,275,601, 2,991,273, 3,271,367, 3,062,781, 2,970,131 and 2,999,846, in German Offenlegungsschriften 1,570,703, 2,063,050, 2,063,052, 2,211,095, French Pat. No. 1,561,518 and in the monograph "H. Schnell, Chemistry and Plastics of Polycarbonates, Interscience Publishers, New York 1964".

Preferred other diphenols are, for example: 4,4'-dihydroxy-diphenyl, 2,2-bis-(4-hydroxyphenyl)-propane, 2,4-bis-(4-hydroxy-phenyl)-2-methylbutane, 1,1-bis-(4-hydroxyphenyl)-cyclohexane,$\alpha,\alpha'$-bis-(4-hydroxyphenyl)-p-diisopropylbenzene,2,2-bis--3-methyl-4-hydroxyphenyl)-propane, 2,2-bis(3-chloro-4-hydroxy-phenyl)-propane, bis-(3,5-dimethyl-4-hydroxyphenyl)-methane, 2,2-bis-(3,5-dimethyl-4-hydroxyphenyl)-propane, bis-(3,5-di-ethyl-4-hydroxyphenyl)-sulphone, 2,4-bis-(3,5-di-methyl-4-hydroxyphenyl)-2-methylbutane, 1,1-bis-(3,5-dimethyl4-hydroxyphenyl)-cyclohexane, $\alpha,\alpha'$-bis-(3,5-dimethyl-4-hydroxyphenyl)-p-diiso-propylbenzene, 2,2--bis-(3,5-dichloro-4-hydroxyphenyl)-propane and 2,2-bis-(3,5-dibromo-4-hydroxyphenyl)propane.

Examples of particularly preferred diphenols of the formula (III) are:
2,2-bis-(4-hydroxyphenyl)-propane, 2,2-bis-(3,5-dimethyl-4-hydroxyphenyl)-propane, 2,2-bis-(3,5-dichloro-4-hydroxyphenyl)propane, 2,2-bis-(3,5-dibromo-4-hydroxyphenyl)-propane and 1,1-bis-(4-hydroxyphenyl)-cyclohexane.

2,2-(4-Hydroxyphenyl)-propane is particularly preferred.

The other diphenols can be used both individually and in mixtures.

The molar ratio of diphenols of the formula (II) to the other diphenols of the formula (III) which may optionally be used, is 100 mole % of (II) to 0 mole % of (III) to 2 mole % of (II) to 98 mole % of (III), preferably 100 mole % of (II) to 0 mole % of (III) to 5 mole % of (II) to 95 mole % of (III), and in particular 100 mole % of (II) to 0 mole % of (III) to 10 mole % of (II) to 90 mole % of (III), and very particularly 100 mole % of (II) to 0 mole % of (III) to 20 mole % of (II) to 80 mole % of (III).

The high molecular polycarbonates from the diphenols of the formula (II), optionally in combination with other diphenols, can be prepared according to known polycarbonate preparation processes. The various diphenols can thus be linked with one another randomly or in blocks.

The polycarbonates of the invention can be branched in a manner known per se. If branching is required, it can be achieved in known manner by condensing small amounts, preferably between 0.05 and 2.0 mole % (relative to diphenols used), of compounds having a functionality of three or more, in particular those having three or more phenolic hydroxyl groups. Some branching agents having three or more phenolic hydroxyl groups are:

phloroglucionol, 4,6-dimethyl-2,4,6-tri-(4-hydroxyphenyl)hept-2-ene, 4,6-dimethyl-2,4,6-tri-(4-hydroxyphenyl)-heptane, 1,3,5-tri-(4-hydroxyphenyl)-benzene, 1,1,1-tri-(hydroxyphenyl)ethane, tri-(4-hydroxyphenyl)-phenylmethane, 2,2-bis-(4,4-bis(4-hydroxyphenyl)-cyclohexylpropane, 2,4-bis-(4-hydroxyphenylisopropyl)-phenol, 2,6-bis-(2-hydroxy-5-methylbenzyl)-4-methylphenol, 2-(4-hydroxyphenyl)-2-(2,4-dihydroxyphenyl)-propane, hexa-(4-(4-hydroxyphenylisopropyl)-phenyl)-ortho-terephthalate, tetra-(4-hydroxyphenyl)-methane, tetra-(4-(4-hydroxyphenylisopropyl)-phenoxy)-methane and 1,4-bis-(4,'-,4"-dihydroxytriphenyl)methyl)-benzene.

Other trifunctional compounds include 2,4-dihydroxybenzoic acid, trimesic acid, cyanuric chloride and 3,3-bis-(3-methyl-4-hydroxyphenyl)-2-oxo-2,3-dihydroindole.

Monofunctional compounds in conventional concentrations serve as chain terminators for controlling the molecular weight of polycarbonates A in a manner known per se. Suitable compounds are, for example phenol, tert.-butylphenols or other $C_1$-$C_7$-alkyl-substituted phenols. Small amounts of phenols of the formula (IV),

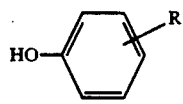

wherein R is a branched $C_8$-alkyl and/or $C_9$-alkyl radical, are particularly suitable for controlling the molecular weight. The proportion of $CH_3$ protons in the alkyl radical R is preferably between 47 and 89% and the proportion of CH and $CH_2$ protons is preferably between 53 and 11%; R is also preferably in the o-position and/or p-position to the OH group, and the upper limit of the ortho proportion is particularly preferably 20%. The chain terminators are generally used in amounts of 0.5 to 10, preferably 1.5 to 8, mole %, relative to the diphenols used.

Polycarbonates A is preferably prepared by phase boundary polymerisation (see H. Schnell, "Chemistry and Physics of Polycarbonates", Polymer Reviews, Volume IX, pages 33 ff., Interscience Publishers, 1964) in a manner known per se. In this process the diphenols of the formula (II) are dissolved in aqueous alkaline phase. For the preparation of copolycarbonates with other diphenols, mixtures of diphenols of the formula (II) and the other diphenols, for example those of the formula (III), are used. Chain terminators, for example of the formula (IV), can be added to control the molecular weight. The mixture is then reacted with phosgene in the presence of an inert, organic phase which preferably dissolves polycarbonate, according to the phase boundary polymerisation method. The reaction temperature is 0° to 40° C.

The branching agents optionally co-used (preferably 0.05 to 2.0 mole %) can either be placed with the diphenols in the aqueous alkaline phase, or can be added dissolved in the organic solvent before reacting with the phosgene.

In addition to the diphenols of the formula (II) and optional other diphenols (III), monochlorocarbonates and/or bischlorocarbonates thereof can also be co-used, wherein these are added dissolved in organic solvents. The amount of chain terminators and branching agents then depends on the molar amount of diphenolate radicals corresponding to formula (II) and optionally formula (III); the amount of phosgene can be reduced correspondingly in known manner when chlorocarbonates are co-used.

Suitable organic solvents for the chain terminators and optionally for the branching agents and the chlorocarbonates are, for example methylene chloride, chlorobenzene, acetone, acetonitrile and mixtures of these solvents, in particular mixtures of methylene chloride and chlorobenzene. The chain terminators and branching agents used may optionally be dissolved in the same solvent.

Examples of the organic phase for the phase boundary polymerisation are methylene chloride, chlorobenzene and mixtures of methylene chloride and chlorobenzene.

Aqueous NaOH solution is an example of aqueous alkaline phase.

The preparation of polycarbonates A in accordance with phase boundary polymerisation may be catalysed in conventional manner by catalysts, such as tertiary amines, in particular tertiary aliphatic amines, such as tributylamine or triethylamine; the catalysts may be used in amounts of 0.05 to 10 mole %, relative to moles of diphenols used. The catalysts may be added before the start of phosgenation or during or even after phosgenation.

Polycarbonates A can also be prepared according to known processes in homogeneous phase, the so-called "Pyridine process" and according to the known melt transesterification process using, for example diphenylcarbonate instead of phosgene.

Polycarbonates A preferably have molecular weights Mw (weight average, determined by gel chromatography after previous calibration) of at least 10,000, particularly preferably 20,000 to 300,000, and in particular 20,000 to 80,000. They may be linear or branched, they are homopolycarbonates or copolycarbonates based on diphenols of the formula (II).

By incorporating diphenols of the formula (II), polycarbonates having high thermal dimensional stability are formed which also have other good properties. This is true particularly for polycarbonates based on diphenols of the formula (II), in which m is 4 or 5, and very particularly for polycarbonates based on diphenols (IIa), wherein $R^1$ and $R^2$ independently of one another have the meaning mentioned for formula (II) and particularly preferably are hydrogen.

Particularly preferred polycarbonates A are thus those in which m=4 or 5 in the structural units of the formula (I) and very particularly those of units of the formula (V)

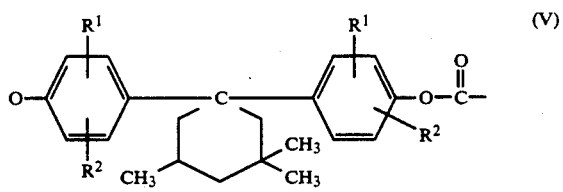

wherein
$R^1$ and $R^2$ have the meaning mentioned for formula (I), but are particularly preferably hydrogen.

These polycarbonates based on diphenols of the formula (IIa), wherein $R^1$ and $R^2$ are especially hydrogen, have, in addition to high thermal dimensional stability, good stability to ultraviolet light and good flow behavior in the melt which was not expected.

In addition, the polycarbonate properties can be varied in a favorable manner due to the choice of composition with other diphenols, in particular with those of the formula (III). In copolycarbonates of this type, the diphenols of the formula (II) are present in amounts of 100 mole % to 2 mole %, preferably in amounts of 100 mole % to 5 mole %, and in particular in amounts of 100 mole % to 10 mole %, and very particularly 100 mole % to 20 mole %, relative in each case to the total amount of 100 mole % of diphenol units in the polycarbonate.

Polycarbonates B

Thermoplastic, aromatic polycarbonates corresponding to B above, are those based on diphenols of the formula (VI)

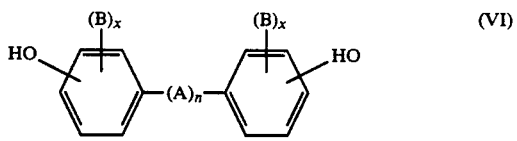

wherein

A is a single bond, $C_1$–$C_5$-alkylene, $C_2$–$C_5$-alkylidene, a $C_5$–$C_6$-cycloalkylidene, —S—, —$SO_2$— or a radical of the formula (VII)

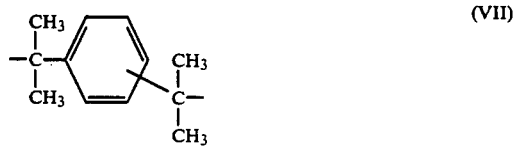

B is hydrogen, linear $C_1$–$C_{10}$-alkyl, branched $C_3$–$C_{20}$-alkyl, $C_6$–$C_{20}$-aryl or halogen, such as chlorine or bromine, x is 0, 1 or 2, and n is 1 or 0, and optionally additionally of the formula (VIa)

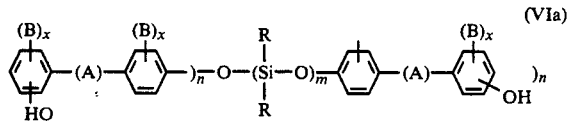

wherein A, B, x and n have the meaning mentioned above, the radicals R are the same or different and correspond to linear $C_1$–$C_{10}$-alkyl, branched $C_3$–$C_{20}$-alkyl, $C_6$–$C_{20}$-aryl, and m is a whole number between 5 and 100, preferably between 20 and 80.

Polycarbonates B suitable according to the invention are both homopolycarbonates and copolycarbonates, the diphenols of the formula (VIa) only being used for the preparation of copolycarbonates with the diphenols of the formula (VI), wherein the weight proportion of diphenols of the formula (VIa) in the copolycarbonates is in each case between 1 and 20 wt.%, preferably between 1.5 and 15 wt.%, and in particular between 2 and 10 wt.%, relative in each case to the total weight of the diphenols of the formula (VI) and (VIa) used.

Mixtures of the thermoplastic polycarbonates defined above may also be used as polycarbonates B, wherein, when they are mixtures with polydiorganosiloxane-polycarbonate block copolymers, the proportion by weight of the diphenols (VIa), relative to the total sum of diphenols in the polycarbonate mixture, is 1 to 20 wt.%.

The preparation of polycarbonates B is known. For example, the diphenols are reacted with phosgene by means of phase boundary polymerisation, or with phosgene according to the homogeneous phase process, the so-called pyridine process. The molecular weight can be adjusted in known manner by an appropriate amount of known chain terminators (for polycarbonates containing polydiorganosiloxane see German Offenlegungsschrift 3,334,872).

Examples of suitable chain terminators are phenol, p-chlorophenol], p-tert.-butylphenol or 2,4,6-tribromophenol, and also long-chain alkylphenols, such as 4-(1,3-tetramethylbutyl)phenol in accordance with German Offenlegungsschrift 2,842,005 or monoalkylphenol or dialkylphenols having a total of 8 to 20 C atoms in the alkyl substituents in accordance with German patent application no. P 3,506,472.2, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)phenol.

In general, the amount of chain terminators is 0.5 to 10 mole %, relative to the sum of diphenols (VI) and optionally (VIa).

Polycarbonates B have average molecular weights Mw (weight average, measured for example by ultracentrifuging or measurement of scattered light) of 10,000 to 200,000, preferably 20,000 to 80,000.

Examples of suitable diphenols of the formula (VI) are hydroquinone, resorcinol, 4,4,'-dihydroxydiphenyl, 2,2-bis(4-hydroxyphenyl)-propane, 2,4-bis-(4-hydroxypentyl)-2-methylbutane, 1,1-bis-(4-hydroxyphenyl)-cyclohexane, 2,2-bis(3-chloro-4-hydroxyphenyl)-propane, 2,2-bis-(3,5-dibromo-4-hydroxyphenyl)-propane.

Preferred diphenols of the formula (VI) are 2,2-bis(4-hydroxyphenyl)-propane, 2,2-bis-(3,5-dichloro-4-hydroxyphenyl)-propane and 1,1-bis-(4-hydroxyphenyl)-cyclohexane.

Suitable diphenols of the formula (VIa) are those in which R is methyl, ethyl, propyl, n-butyl, tert.-butyl or phenyl.

Preferred diphenols of the formula (VIa) are those of the formula (VIb)

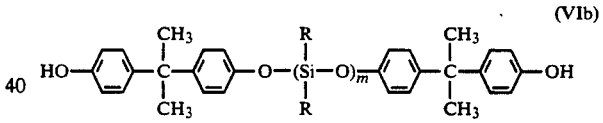

wherein the radicals R are as defined above, preferably denote methyl, ethyl, propyl, n-butyl.tert.-butyl and m is a whole number from 5 to 100, preferably 20 to 80.

The diphenols of the formula (VIa) can be prepared, for example from the corresponding bis-chloro compounds of the formula (VIII)

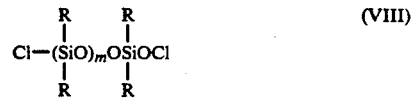

and the diphenols of the formula (VI), for example in accordance with U.S. Pat. No. 3,419,634, column 3, in combination with U.S. Pat. No. 3,189,662.

In the bis-chloro compounds (VIII), R and m have the same meaning as in the diphenols (VIa) or (VIb).

Polycarbonates B can be branched in known manner, and indeed preferably by incorporating 0.5 to 2.0 mole %, relative to the sum of diphenols used, of compounds having a functionality of three or more, for example those having three or more phenolic groups.

In addition to the bisphenol-A homopolycarbonate, preferred polycarbonates B are the copolycarbonates of bisphenol A with up to 15 mole %, relative to the mole sum of diphenols, of 2,2-bis-(3,5-dibromo-4-hydroxyphenyl)-propane, or the copolycarbonates of the diphenols of the formula (VI) with 1 to 20 wt.% of diphenols of the formula (VIa), preferably of the formula (VIb), relative in each case to the weight sum of the diphenols (VI) and (VIa) or (VI) and (VIb).

Graft polymers C

Suitable diene rubbers C.2 for the preparation of graft polymers C are in particular polybutadiene, butadiene copolymers having up to 30 wt.%, relative to the weight of rubber, of other ethylenically unsaturated monomers, such as styrene or acrylonitrile, or esters of acrylic acid or methacrylic acid with $C_1-C_4$-alcohols, such as methylmethacrylate, ethylacrylate, methylacrylate or ethylmethacrylate, polyisoprene or polychloroprene. Pure polybutadiene is preferred.

These rubbers C.2 are present in the form of at least partially crosslinked particles of an average particle diameter d50 of 0.09 to 1 $\mu$m, in particular 0.1 to 0.6 $\mu$m.

These graft polymers C can be obtained by free-radical polymerisation of monomers C.1.1 and C.1.2 in the presence of the rubbers.

This graft polymerisation can be carried out in suspension, dispersion or emulsion at 40° to 90° C. Continuous or batch emulsion polymerisation is preferred. Graft polymerisation can be carried out using free-radical initiators (for example peroxides, azo compounds, hydrogen peroxides, persulphates, perphosphates), and optionally requires anionic emulsifiers, for example carboxonium salts, sulphonic acid salts or organic sulphates. The graft polymers are thus formed with high graft yields, that is a large proportion of the polymer of monomer C.1 is chemically bonded to the rubber C.2.

The graft polymers C are obtained by graft polymerization of 5 to 90, preferably 20 to 80 parts by weight, of a vinyl monomer or of a vinyl monomer mixture C.1 onto 10 to 95, preferably 20 to 80 parts by weight of a rubber C.2.

Suitable vinyl monomer mixtures consist of 50 to 95 parts by weight of styrene, α-methylstyrene (or other styrenes of which ring is substituted by alkyl or halogen), methacrylates or acrylates, and of 5 to 50 parts by weight of acrylonitrile, methacrylonitrile, methacrylates, acrylates, maleic acid anhydride or substituted maleic imides.

Suitable methacrylates and acrylates are those with monovalent alcohols having 1 to 8 C atoms. Methylmethacrylate, ethylmethacrylate and propylmethacrylate are particularly preferred.

Preferred monomers for constructing the graft shells are styrene/acrylonitrile mixtures and styrene/maleic acid anhydride mixtures. Small amounts of acrylates of primary or secondary aliphatic $C_2-C_{20}$-alcohols, preferably n-butylacrylate, or acrylate or methacrylate of tert.-butanol, preferably t-butylacrylate, can also be co-used as further monomers.

Examples of preferred graft polymers C are those with styrene, acrylonitrile, alkyl methacrylates, alkyl acrylates or mixtures thereof, polybutadiene or butadiene/styrene copolymers. Such copolymers are described, for example in German Offenlegungschrift 1,694,173.

Particularly preferred polymers C are ABS polymers, as described in German Offenlegungsschrift 2,035,390 and in German Offenlegungsschrift 2,248,242.

During the preparation of graft polymers C, in addition to the actual graft polymer, in general free polymers or copolymers of the graft monomers forming the graft shell are also produced.

Graft polymers C are the products obtained by polymerisation of the graft polymers C.1 in the presence of rubber C.2, or more specifically mixtures of graft copolymer and free polymer of graft monomer C.1.

The molding compositions of the invention have optimum properties if the amount of free polymer does not exceed 50 wt.%, preferably 30 wt.%, in particular 20 wt.%, relative to component C.

The molding compositions of the invention may contain further additives known to be suitable for aromatic polycarbonatesand graft polymers, such as stabilizers, pigments, mold release agents, flame retardants and antistatic agents, in the conventional amounts.

The molding compositions of the invention are prepared by mixing the components in known manner and melt compounding or melt extruding in conventional apparatus, such as internal kneaders, extruders or double wave extruders at elevated temperatures, preferably at 200° to 350° C. The individual components may be mixed one after the other or simultaneously.

A further object of the invention is therefore a process for the preparation of the molding compositions described by mixing the components at elevated temperature.

The molding compositions of the invention may be used to manufacture molded bodies of any type, for example by injection molding. Examples of molded bodies are: housing parts (for example for household appliances, such as juice extractors, coffee machines, mixers), cover plates for the building and construction trade or automobile parts. In addition, they are used for electrical devices, for example for plug surrounds, because they have very good electrical properties.

Molded bodies can also be manufactured from previously prepared plates or sheets by deep drawing.

A further object of the invention is therefore the use of the molding compositions described to manufacture molded bodies.

EXAMPLES

Parts given denote parts by weight.

Polycarbonate A 1436.4 g (6.3 moles) of bisphenol A (2,2-bis-(4-hydroxyphenyl)propane, 2387.0 g (7.7 moles) of 1,1-bis-(4-hydroxyphenyl)3,3,5-trimethylcyclohexane, 7476.0 g (84 moles) of 45% strength NaOH and 33.7 liters of water are dissolved with stirring in an inert gas atmosphere. A solution of 36.9 g (0.392 mole) of phenol in 11 liters of methylene chloride and 13 liters of chlorobenzene is then added. 2772 g (28 moles) of phosgene were introduced into the well-stirred solution at pH 13 to 14 and 21 to 25° C. 14 ml of ethylpiperidine are then added and the solution is stirred for a further 45 minutes. The aqueous phase free of bisphenolate is separated off, after partial acidification with phosphoric acid the organic phase is washed with water until it is free of electrolyte and solvent is removed. The polycarbonate showed a relative solution viscosity of 1.30. The glass temperature of the polymer was determined as 206° C. (DSC).

Polycarbonate B

Linear polycarbonate based on bisphenol A having a relative solution viscosity of 1.26 to 1.28, measured in $CH_2Cl_2$ at 25° C. and a concentration of 0.5 g/ml.

Graft Polymer C

Graft polymer of 50 parts by weight of a copolymer of styrene and acrylonitrile in a ratio 72:28 on 50 parts by weight of particle-type polybutadiene rubber (average particle diameter d50 0.4 μm), prepared by emulsion polymerisation.

Preparation and testing of the molding compositions of the invention

A, B and C were melted on a 1.3 liter internal kneader at temperatures between 250° and 320° C. and homogenised.

Rods of the molding compositions measuring 80×10×4 mm were prepared in an injection molding machine (processing temperature: 280° C., the Izod impact strength (in accordance with method ISO 180) was measured on these at room temperature.

The thermal dimensional stability in accordance with Vicat B was determined according to DIN 53 460.

As can be seen from Table 1, the Examples B to D of the invention show considerably higher Vicat temperatures at an impact strength level which is largely comparable to Comparative Example A.

TABLE I

Composition of the molding compositions and their properties

| Example | A (wt %) | B (wt %) | C (wt %) | Vicat B 120 (°C.) | Izod impact strength ak at room temperature (kj/m²) |
| --- | --- | --- | --- | --- | --- |
| A | (Comparison) | 80 | 20 | 141 | 58 |
| B | 20 | 60 | 20 | 150 | 55 |
| C | 40 | 40 | 20 | 161 | 46 |
| D | 60 | 20 | 20 | 171 | 37 |

What is claimed is:

1. A thermoplastic molding composition comprising:
A) 5 to 99 parts by weight, relative to the weight of the molding composition, of an aromatic polycarbonate which contains bifunctional structural units of formula (I)

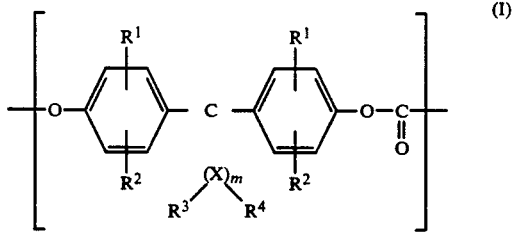

wherein
$R^1$ and $R^2$ independently of one another denote hydrogen, halogen, $C_1$-$C_8$-alkyl, $C_5$-$C_6$-cycloalkyl, $C_6$-$C_{10}$-aryl or $C_7$-$C_{12}$-aralkyl,
m denotes a whole number from 4 to 7,
$R^3$ and $R^4$ are selected individually for each X and independently of one another denote hydrogen or $C_1$-$C_6$ alkyl and
X denotes carbon,
with the proviso that $R^3$ and $R^4$ simultaneously denote alkyl at at least one atom X, and B) 5 to 99 parts by weight, relative to the weight of the molding composition, of an aromatic polycarbonate based on diphenols of formula (VI)

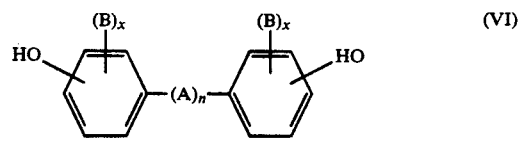

wherein
A is a single bond, $C_1$-$C_5$-alkylene, $C_2$-$C_5$-alkylidene, a $C_5$-$C_6$-cycloalkylidene, —S—, —$SO_2$— or a radical of the formula (VII)

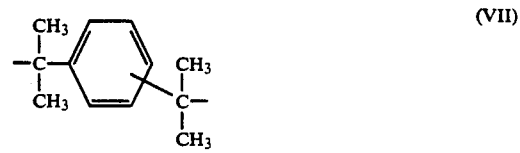

B is hydrogen, linear $C_1$-$C_{10}$-alkyl, branched $C_3$-$C_{20}$-alkyl, $C_6$-$C_{20}$-aryl or a halogen atom,
x is 0, 1 or 2, and
n is 1 or 0,
and C) 1 to 95 parts by weight relative to the weight of the molding composition, of a graft polymer of
C.1 which denotes 5 to 90 parts by weight of (i) (ii) or (iii) on C.2 which denotes 10 to 95 parts by weight of diene rubber having an average particle diameter d50 of 0.09 to 1 μm, and a gel content of more than 50 wt. % relative to C.2 and wherein said
(i) is a mixture of 50 to 95% by weight of at least one member selected from the group consisting of styrene, α-methylstyrene, styrene which ring is substituted by halogen or by $C_1$-$C_4$-alkyl, and 50 to 5% by weight of at least one member selected from the group consisting of acrylonitrile, methacrylonitrile, methacrylate, acrylate, maleic imide, $C_1$-$C_4$-alkyl substituted maleic imide, and phenyl-N-substituted maleic imide, and where
(ii) is a mixture of 50 to 95% by weight of at least one member selected from the group consisting of styrene, α-methylstyrene, styrene which ring is substituted by halogen or by $C_1$-$C_4$-alkyl, methacrylate and acrylate and 50 to 5% by weight of at least one member selected from the group consisting of acrylonitrile, methacrylonitrile, maleic imide, $C_1$-$C_4$-alkyl substituted maleic imide, phenyl-N-substituted maleic imide, and where
(iii) is at least one member selected from the group consisting of methacrylates and acrylates.

2. The molding composition of claim 1, additionally containing at least one member selected from the group consisting of stabilizers, pigments, flow control agents, mold release agents, flame retardants and antistatic agents.

3. The composition of claim 1 wherein said B) is additionally based on diphenols corresponding to

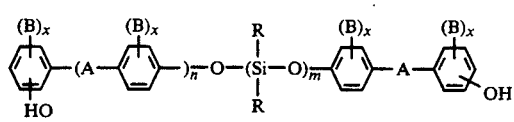
wherein R independently denotes a linear $C_{1-10}$-alkyl, branched $C_{3-20}$-alkyl or $C_{6-20}$-aryl, B is a hydrogen, linear $C_{1-10}$-alkyl, branched $C_{3-20}$-alkyl, $C_{6-20}$-aryl or a halogen atom, x is 0, 1 or 2, n is 1 or 0, A is a single bond, $C_{1-5}$-alkylene, $C_{2-5}$-alkylidene, $C_{5-6}$-cycloalkylidene, —S—, —SO$_2$ or a radical of the formula (VII)
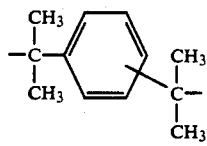
and m is a whole number between 5 and 100.
* * * * *